US012190648B1

(12) United States Patent
Ricks et al.

(10) Patent No.: US 12,190,648 B1
(45) Date of Patent: Jan. 7, 2025

(54) SYSTEMS AND METHODS FOR MAINTAINING VEHICLE HEALTH

(71) Applicant: United Services Automobile Association (USAA), San Antonio, TX (US)

(72) Inventors: Brennen Michael Ricks, San Antonio, TX (US); Kevin McAdams, Boerne, TX (US); Yevgeniy Viatcheslavovich Khmelev, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 189 days.

(21) Appl. No.: 17/900,601

(22) Filed: Aug. 31, 2022

Related U.S. Application Data

(60) Provisional application No. 63/239,063, filed on Aug. 31, 2021.

(51) Int. Cl.
*G07C 5/00* (2006.01)
*G07C 5/08* (2006.01)

(52) U.S. Cl.
CPC ............. *G07C 5/006* (2013.01); *G07C 5/008* (2013.01); *G07C 5/0841* (2013.01)

(58) Field of Classification Search
CPC ....... G07C 5/006; G07C 5/008; G07C 5/0841
USPC .......................................................... 701/31.4
See application file for complete search history.

(56) References Cited

U.S. PATENT DOCUMENTS

| | | | | |
|---|---|---|---|---|
| 8,209,076 B2 * | 6/2012 | Boss | G06Q 10/20 | 340/568.1 |
| 8,886,392 B1 * | 11/2014 | Maeng | G07C 5/085 | 701/34.2 |
| 2008/0027604 A1 * | 1/2008 | Oesterling | G07C 5/008 | 701/29.5 |
| 2011/0172873 A1 * | 7/2011 | Szwabowski | G08G 1/0962 | 701/29.5 |
| 2013/0325541 A1 * | 12/2013 | Capriotti | G06Q 10/087 | 705/7.21 |
| 2016/0071333 A1 * | 3/2016 | Haidar | G07C 5/006 | 701/29.3 |
| 2016/0110934 A1 * | 4/2016 | Ernst | G07C 5/006 | 701/29.6 |

(Continued)

FOREIGN PATENT DOCUMENTS

| | | | | |
|---|---|---|---|---|
| EP | 3502983 A1 * | 6/2019 | G06N 20/00 |
| EP | 3582154 A1 * | 12/2019 | G01D 21/02 |
| WO | WO-2019124909 A1 * | 6/2019 | G05B 19/0428 |

*Primary Examiner* — Tuan C To

(74) *Attorney, Agent, or Firm* — Fletcher Yoder, PC

(57) ABSTRACT

A system includes a computing device comprising a processor and a memory. The processor is configured to receive: vehicle data associated with a vehicle associated with a user, where the vehicle data is indicative of characteristics of the vehicle, maintenance recommendation data indicative of vehicle maintenance recommendations for the vehicle, maintenance service data indicative of maintenance services performed on the vehicle, and activity data associated with operation of the vehicle. The processor may then identify a maintenance service to be performed on the vehicle based on the received data and send a notification to a user computing device with an indication of the maintenance service to be performed.

20 Claims, 3 Drawing Sheets

(56) References Cited

U.S. PATENT DOCUMENTS

| | | | | |
|---|---|---|---|---|
| 2017/0236100 | A1* | 8/2017 | Bayat | G06Q 10/20 705/305 |
| 2019/0206149 | A1* | 7/2019 | Sakurada | G07C 5/008 |
| 2020/0216080 | A1* | 7/2020 | Soltanian | A61B 5/7267 |
| 2023/0018569 | A1* | 1/2023 | Nurse | G06Q 30/0283 |
| 2023/0067998 | A1* | 3/2023 | Suzuki | G06Q 10/1095 |

* cited by examiner

SYSTEMS AND METHODS FOR MAINTAINING VEHICLE HEALTH

CROSS-REFERENCE TO RELATED APPLICATIONS

This application claims priority to and the benefit of U.S. Provisional Application No. 63/239,063, entitled "Systems and Methods for Maintaining Vehicle Health," filed Aug. 31, 2021, which is hereby incorporated by reference in its entirety for all purposes.

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Vehicles must oftentimes undergo maintenance to operate properly and efficiently. Typically, vehicles receive maintenance (e.g., oil change, tire rotation, tire alignment, car wash, and the like) from a number of different parties or vendors who may be qualified to operate on a particular problem or address an issue associated with the vehicle. However, it may be difficult to track and/or monitor all of the maintenance done on a vehicle due to the number of different parties operating on the vehicle and because each maintenance issue is separately stored and only associated with the service provider conducting the services. Accordingly, it may be particularly advantageous to provide an improved method of recording, storing, accessing, and sharing such maintenance records and information, thereby facilitating the generation of maintenance recommendations and the valuation of the vehicle.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a system includes a computing device comprising a processor and a memory. The processor is configured to receive: vehicle data associated with a vehicle associated with a user, where the vehicle data is indicative of one or more characteristics of the vehicle, maintenance recommendation data from a plurality of sources, where the maintenance recommendation data is indicative of one or more vehicle maintenance recommendations for the vehicle, maintenance service data associated with the vehicle, where the maintenance service data is indicative of one or more maintenance services performed on the vehicle, and activity data from one or more sensors associated with the vehicle, where the activity data is associated with operation of the vehicle. The processor is also configured to identify a maintenance service to be performed based on the vehicle data, the maintenance recommendation data, the maintenance service data, and the activity data, and send a notification to a user computing device associated with the user in response to identifying the maintenance service to be performed, where the notification comprises an indication of the maintenance service to be performed.

In another embodiment, a non-transitory, computer-readable medium comprising computer-executable instructions configured to, when executed, cause a processor to receive vehicle data associated with a vehicle associated with a user, where the vehicle data is indicative of one or more characteristics of the vehicle and maintenance recommendation data from a plurality of sources, where the maintenance recommendation data is indicative of one or more vehicle maintenance recommendations for the vehicle, and where the one or more vehicle recommendations correspond to one or more threshold values that define a routine amount of maintenance for the vehicle. The processor may also receive maintenance service data associated with the vehicle, where the maintenance service data is indicative of an amount of maintenance performed on the vehicle, activity data from one or more sensors associated with the vehicle, where the activity data is associated with operation of the vehicle, and reference vehicle data from a plurality of sources, where the reference vehicle data is indicative of relative values of one or more vehicles having characteristics with less than a threshold amount of deviation from the one or more characteristics of the vehicle. The processor may also determine a relative value of the vehicle based on the vehicle data, the maintenance recommendation data, the maintenance service data, the activity data, and the reference vehicle data.

In another embodiment, a method includes receiving, via a processor, vehicle data associated with a vehicle associated with a user, where the vehicle data is indicative of one or more characteristics of the vehicle and maintenance recommendation data from a plurality of sources, where the maintenance recommendation data is indicative of a recommended amount of maintenance for the vehicle. The method further includes receiving, via the processor, maintenance service data associated with the vehicle, where the maintenance service data corresponds to one or more maintenance services performed on the vehicle and activity data from one or more sensors associated with the vehicle, where the activity data is associated with operation of the vehicle. The method further includes identifying, via the processor, a maintenance service to be performed on the vehicle based on the user data, the maintenance recommendation data, the maintenance service data, and the activity data and sending, via the processor, a notification to a user computing device associated with the user in response to identifying the maintenance service to be performed, where the notification comprises an indication of the maintenance service to be performed.

BRIEF DESCRIPTION OF THE DRAWINGS

These and other features, aspects, and advantages of the disclosed subject matter will become better understood when the following detailed description is read with reference to the accompanying drawings in which like characters represent like parts throughout the drawings, wherein.

DETAILED DESCRIPTION

Figure 1:
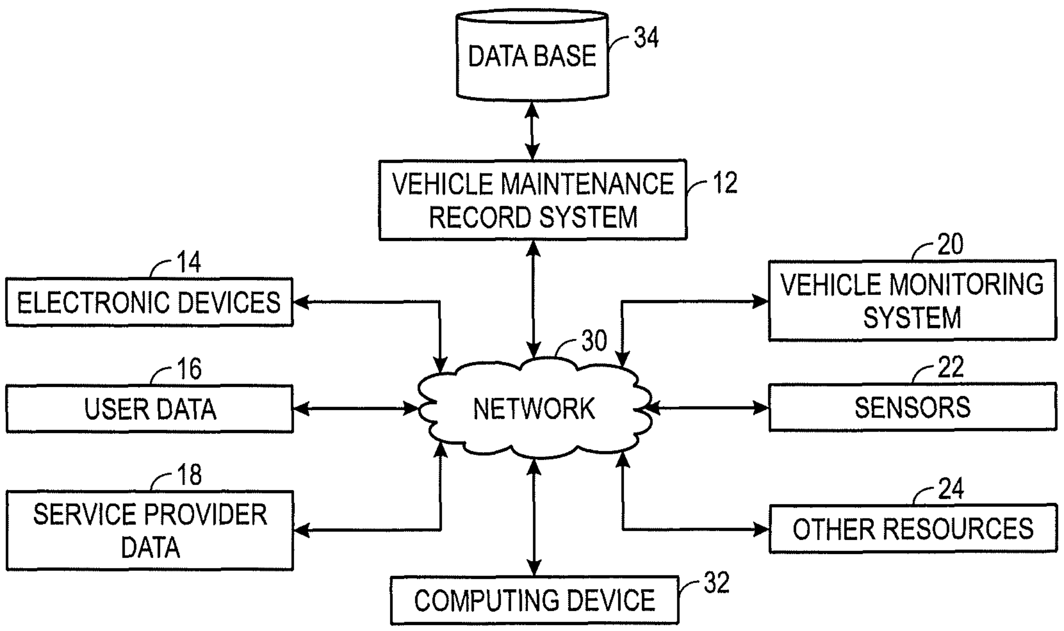
FIG. 1 illustrates a block diagram of a vehicle maintenance record system for storing, tracking, and sharing vehicle maintenance records, in accordance with embodiments described herein.

The present disclosure relates generally to systems and methods for improving the collection, storage, accessibility, and shareability of vehicle maintenance records. For example, the techniques provided herein may allow for a user to upload maintenance records to a centralized database configured to maintain various types of maintenance records, such that information may be easily retrieved to confirm whether a user properly maintained a vehicle.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an exemplary embodiment," or "an embodiment" of the present disclosure are not intended to be interpreted as excluding the existence of additional embodiments that also incorporate the recited features.

As may be appreciated, implementations of the present disclosure may be embodied as a system, method, device, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer-readable program code embodied thereon.

Over a vehicle's lifetime, individuals may perform maintenance to reduce the probability of the vehicle malfunctioning, to increase a comfort level for passengers of the vehicle, and to increase the longevity of the vehicle. As discussed herein, "vehicles" may refer to any mode of transportation and/or method of hauling equipment including, but not limited to, cars, trucks, SUVs, eighteen wheelers, boats, trailers, motorcycles, bicycles, dirt bikes, and the like. Vehicles that experience "routine" maintenance (e.g., regular oil changes, tire rotations, and the like) may avoid unexpected repairs and replacements which can be expensive. Further, routine maintenance performed on a vehicle may be related to the vehicle's value. That is, vehicles receiving "routine" maintenance may have a higher value compared to vehicles receiving less than a routine amount of maintenance (e.g., missing oil changes, rotating tires less than a threshold amount of times). However, it may be difficult to maintain a cumulative record of a particular vehicle's maintenance history due to the number of different parties that may perform maintenance and the method of recording the maintenance. For example, an individual may elect to receive an oil change from a first vendor (e.g., a general service and good provider) which records the oil change in their system, and then the individual may elect to receive a tire rotation from a second vendor (e.g., a specialty service and parts provider) which records the tire rotation in their system. Unfortunately, the two systems do not communicate with one another, and thus individuals are left to manage their vehicle's maintenance records themselves.

With this in mind, the advent of systems and methods that may track, monitor, share, and analyze vehicle maintenance records from various different vendors or service providers makes valuating an individual's vehicle more feasible. That is, it may be beneficial to provide systems and methods that can detect when maintenance activities or services are performed, such that parties (e.g., clients, customers, businesses, service providers, and the like) involved in the transactions may be provided an opportunity to protect their interests. In some embodiments, maintenance data acquired from various service providers and sources may be used to generate customized insurance packages based on the frequency of maintenance, the quality of service provider, and the like. Additionally, notifications may be generated to prompt a user to perform a particular maintenance service based on the received data. The present embodiments described herein may detail various hardware components and methodologies that may enable an insurance provider to detect the occurrence of maintenance transactions on a vehicle, determine whether additional maintenance should be performed, and offer insurance packages to cover the vehicle based on the maintenance data. Additional details regarding the systems and methods for recording, storing, accessing, and sharing vehicle maintenance records, as well as providing insurance packages based on the collected maintenance records will be discussed below with reference to FIGS. 1-4. The By way of introduction, FIG. 1 illustrates a block diagram of a system 10 in which a vehicle maintenance record system 12 may receive data (e.g., maintenance data) that may be stored and further used to detect a time when maintenance should be performed. Additionally, the received data may be used to develop insurance packages and/or options to cover the vehicle and/or the owner of the vehicle based on the maintenance performed. Referring now to FIG. 1, the vehicle maintenance record system 12 may receive data from various sources. The received data may be related to user information, maintenance recommendations from manufacturers, and/or maintenance service data indicative of maintenance services performed on a particular vehicle within the vehicle maintenance record system 12 (e.g., type, cost, time, duration of the service, parties involved in the services, insurance associated with the services, and the like). Using the collected data, the vehicle maintenance record system 12 may determine that a particular type of maintenance is needed, and may send a notification to a user that includes a recommendation to perform a particular type of maintenance to reduce the user's likelihood of being involved in an accident. Further, the maintenance data may be used to facilitate the valuation of the vehicle, which in turn may be used to provide updated insurance package options. That is, the vehicle maintenance record system 12 may analyze the collected maintenance data to determine whether a vehicle's value should be adjusted based on maintenance services performed, and if so, if the insurance policy associated with the vehicle should be updated as a result of the vehicle's value change. The vehicle maintenance record system 12 may then send a notification to a user indicating that updated insurance packages may be available that correspond to the vehicle's updated value.

In some embodiments, the vehicle maintenance record system 12 may be any suitable computing or server device. Using data sources (e.g., databases, service providers, user electronic devices, user information) accessible to the vehicle maintenance record system 12, the vehicle maintenance record system 12 may receive data regarding the transactions or maintenance services performed and associated with a particular user's vehicle. For example, the vehicle maintenance record system 12 may receive data from sources such as an electronic device 14 (e.g., a mobile phone, a smart watch, a laptop, an audio device, a camera, a plug in stick, and the like) associated with a user or service provider, user data 16 associated with a user (e.g., vehicle owner), service provider data 18 associated with a maintenance service provider (e.g., maintenance shop, tire shop, automotive repair shop, oil change shop), a vehicle monitoring system 20, sensors 22, and other resources 24. The data may be received in real time or near-real time, thereby enabling the vehicle maintenance record system 12 to perform the embodiments described herein in a timely manner to cover any related activities that are performed soon after.

The electronic device 14 may be any suitable computing device capable of transmitting information or data associated with an aspect of a maintenance transaction or service provided within the vehicle maintenance record system 12. The electronic device 14 may be a cellular phone, a wearable device (e.g., smart watch), a speaker, a camera, an electronic notepad, a laptop, and the like, and may be associated with a client, a customer, and/or a service provider, and the like. For example, the electronic device 14 may be a camera associated with a user's vehicle that may record video or image data of maintenance service transactions (e.g., image data inside/outside of vehicle) and may send the image data to the vehicle maintenance record system 12. In some embodiments, the electronic device 14 may be a plug in stick that may be inserted (e.g., plugged in) into an appropriate receptacle on the vehicle and may be configured to receive information related to the vehicle's status (e.g., whether a problem is present, the source of the problem, a solution to the problem). Upon receiving the status information from the vehicle, the plug in stick may be configured to send the data to the vehicle maintenance record system 12 such that the vehicle maintenance record system 12 may be updated with current maintenance information (e.g., activity being performed, service provider performing activity). Data and information from the electronic device 14 may be acquired by mining data sources such as cameras, speakers, phones, and the like that have access to information related to the maintenance services provided within the vehicle maintenance record system 12. In some embodiments, the data from the electronic devices 14 may be directly input by a user into the vehicle maintenance record system 12 via a software application that provides recommendations for maintenance and indications for insurance packages available to provide additional coverage for the user and/or the vehicle based on the received data. In other embodiments, the vehicle maintenance record system 12 may push a notification to a user's computing device recommending coverage based on the analysis described below.

The user data 16 may include information regarding the user's purchases and bank account information associated with the user. The user data 16 may include sales and purchases from an e-wallet, credit card purchases, and online account purchases associated with a vehicle and/or vehicle maintenance (e.g., purchasing a vehicle, purchasing vehicle parts, paying for maintenance services). The user data 16 may also include information about the user's vehicles (e.g., manufacturer, model, year, mileage, accident history, and the like). Further, the user data 16 may include information related to a user's current insurance policy (e.g., whether a user has automobile insurance, the cost of the insurance, the cost of the deductible, and the coverage provided by the policy). As indicated above, users may directly input data via the electronic devices 14, and the input data may be uploaded to a user's universal profile within the vehicle maintenance record system 12. Alternatively, the user data 16 may be acquired by mining data sources such as credit card databases, bank account databases, insurance databases, and other sources that have access to the individual's account history, financial records, and insurance policy information. The vehicle maintenance record system 12 may perform the mining, which may be based on permissions provided by a user, and may identify vehicle-based information using metadata or identifying information associated with payments. Further artificial intelligence may be employed to filter data to identify information relevant to a particular vehicle. In some embodiments, the user data 16 may be scanned from a receipt (e.g., via a scanner function of the electronic devices 14).

The service provider data 18 may include information and data associated with the automobile maintenance transactions and services being performed. The service provider data 18 may include information about the individual (e.g., repair personnel, maintenance shop attendant) performing the maintenance, the company performing the maintenance, a cost of the services, activities performed, and the like. Further, the service provider data 18 may provide information related to a rating or quality level of the service provider.

The vehicle monitoring system 20 may be associated with certain electronic devices 14 and sensors 22 (e.g., plug in stick, global positioning system (GPS), speedometer) to provide activity data associated with the maintenance services being performed. The vehicle monitoring system 20 may provide information including a time of service provided, image data of the services provided, a location of the services provided, and the like. For example, the vehicle monitoring system 20 may be equipped with a camera that records and provides image data of maintenance activity being performed on the vehicle. This data may be used by the vehicle maintenance record system 12 to confirm whether the individual performed maintenance correctly (e.g., followed approved procedures). Further, the vehicle monitoring system 20 may provide activity data associated with the user's driving tendencies and a manner in which the user handles an automobile. For example, the camera discussed above may record the activity within and around the vehicle while the vehicle is operating. This data may be used by the vehicle maintenance record system 12 to determine user's driving tendencies (e.g., speeding, spinning tires (peeling out), making sharp turns, smoking in the vehicle), which may have an effect on the vehicles longevity and value (e.g., driving poorly means you need maintenance more often to maintain your policy).

In some embodiments, the vehicle monitoring system 20 may be equipped to receive a plug-in stick (e.g., a dongle or OBD-II device) that may communicate with the vehicle's operating components. That is, in traditional embodiments, a plug-in stick may be used by a mechanic to diagnose a problem that the vehicle is experiencing. In the disclosed embodiments herein, when inserted, the plug-in stick may communicate with the vehicle monitoring system 20 such that the vehicle maintenance record system 12 is updated with any diagnostic problems associated with the vehicle. Further, the plug-in stick may be used by service providers to upload maintenance services performed on the vehicle.

The sensors 22 may include any type of device capable of measuring location, pressure, moisture, temperature, light, and the like. One or more sensors 22 may be disposed within or around an exterior of the vehicle, or on devices carried or worn by individuals. In one embodiments, the sensors 22 may provide location information regarding the sensors 22. As such, the sensors 22 may provide global positioning system (GPS) coordinates and the like to indicate a location of the sensors 22. In other embodiments, the sensors 22 may include network devices which receive voice commands from a user disposed within the vehicle. The sensors 22 may provide data regarding the physical properties associated with an individual's vehicle. For example, the sensors 22 may be disposed within the user's vehicle and provide information regarding temperature, humidity, pressure, and the like to determine whether the conditions inside the vehicle warrant additional maintenance to avoid a lapse in coverage.

The other resources 24 may include any other electronic information that may be available via a network, the Internet, or the like. That is, the other resources 24 may include electronic news resources, social media resources, online traffic and online data from other individuals, purchase and sales data of maintenance services from other individuals, and the like. The electronic news sources may include various news services and sources that may be updated in real time or near real time via a network (e.g., Internet). The electronic news resources may also provide information and data associated with the transactions and services being performed, and any other information that may be published via an electronic news outlet such as a webpage, news database, microblogging service, social media outlet, or the like. For example, the electronic news resources may keep the vehicle maintenance record system 12 up to date with news on business and/or companies providing services within the vehicle maintenance record system 12 to ensure that the vehicle maintenance record system 12 makes determinations based on updated information.

The social media resources may include data from individuals' accounts on available social media sites. In one embodiment, the social media resources may include information associated with an individual receiving services within the vehicle maintenance record system 12 and may be received from one of the electronic devices 14 described above. For example, the social media resources may be associated with a user's personal account, and may include information regarding the user's recent activity. The social media resources may also include data trending on social media sites that may not be directly associated with the individual. In some embodiments, the social media resources may include crowd source data that is updated in real time (e.g., near instantaneous). Although the crowd source data may not be verified, it can often provide information related to an event more quickly than certain electronic news resources. Further, information related to service providers acquired from other individuals may be used by the vehicle maintenance record system 12 to determine a rating or quality level of various service providers, which in turn may be used by the vehicle maintenance record system 12 to determine whether an individual should receive maintenance from a different service provider.

The other resources 24 may also include information from automobile dealers and manufacturers and other individuals (e.g., sale and purchase information from other users), and may be related to maintenance recommendations for particular vehicles (e.g., oil change every 3,000 miles, tire rotation every 7,500 miles, car wash every 2 months, and the like) and/or the value of the vehicle. That is, the vehicle maintenance record system 12 may mine online resources to determine a vehicle's value and a time and/or frequency that certain maintenance procedures should be performed, such that the vehicle maintenance record system 12 can alert a user to perform those services to maintain the vehicle's value.

In certain embodiments, the data sources may communicate with one another and with the vehicle maintenance record system 12 over a network 30. The network 30 may be any suitable wired or wireless (e.g., radio or light based) network that may facilitate communication of data between devices. In some embodiments, the network 30 may be a Wi-Fi network, a light detection and ranging (LIDAR) network, a LIDAR device, a 4G network, a 4G LTE network, a 5G network, a Bluetooth network, a Near Field Communication (NFC) network, or any suitable network for communicating information between devices. Communication via the network 30 may allow the devices and data sources connected to the network 30 to collect and communicate data pertaining to the transactions occurring and the maintenance services provided.

With the foregoing in mind, the vehicle maintenance record system 12 may receive data from the various sources described above to identify maintenance services performed, whether additional maintenance is warranted, and whether updated insurance packages may be warranted based on the maintenance services performed. The vehicle maintenance record system 12 may send a notification or alert to a computing device 32 associated with the individuals receiving the maintenance via the network 30 or via a direct communication link. It should be noted that the computing device 32 may be similar to the electronic devices 14 and in some embodiments, the computing device 32 may be one of the electronic devices 14 used by the vehicle maintenance record system 12 as a data source. The vehicle maintenance record system 12 and the computing device 32 may include any suitable computing device such as a general-purpose computer, a mobile computing device, a laptop-computing device, a tablet computing device, a wearable computing device, and the like. Additional details with regard to the vehicle maintenance record system 12 will be discussed below with reference to FIG. 2.

After receiving the notification, the computing device 32 may provide an indication that the notification was received and automatically display the notification suggesting additional maintenance or insurance coverage packages for the user's automobile via a text message, an email message, an alert, or the like. In some embodiments, the indication may be activated despite the computing device 32 being in a sleep or low power mode to increase the likelihood that the user will take note of the notification. In any case, the notification may notify the user that additional maintenance may be warranted and may display insurance packages available to address certain aspects of the transaction or services provided.

In some embodiments, the operations performed by the vehicle maintenance record system 12 may be triggered or initiated based on conditions detected by or input data received by one or more of the devices described above. In this way, the vehicle maintenance record system 12 may preserve its processing power to identify opportunities for additional maintenance and/or insurance coverage, and/or determine the costs for the insurance coverage in response to detecting that a situation that may warrant insurance coverage is present. As such, the operations of the vehicle maintenance record system 12 may be controlled based on conditions being present or data being received.

Figure 2:
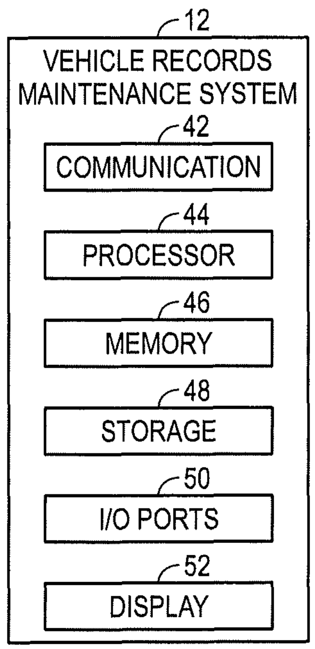
FIG. 2 illustrates a block diagram of a computing device that may be part of the vehicle maintenance records system of FIG. 1, in accordance with embodiments described herein.

To perform some of the actions set forth above, the vehicle maintenance record system 12 may include certain components to facilitate these actions. FIG. 2 is a block diagram of example components within the vehicle maintenance record system 12. For example, the vehicle maintenance record system 12 may include a communication component 42, a processor 44, a memory 46, a storage 48, input/output (I/O) ports 50, a display 52, and the like. The communication component 42 may be a wireless or wired communication component that may facilitate communication between the vehicle maintenance record system 12, the electronic devices 14, the vehicle monitoring system 20, the sensors 22, the computing device 32, a database 34 (illustrated in FIG. 1), and the like. Additionally, the communication component 42 may facilitate data transfer to the vehicle maintenance record system 12, such that the vehicle maintenance record system 12 may receive the user data 16, the service provider data 18, information and/or from the other resources 24, and the like.

The processor 44 may be any type of computer processor or microprocessor capable of executing computer-executable code. The processor 44 may also include multiple processors that may perform the operations described below.

The memory 46 and the storage 48 may be any suitable articles of manufacture that can serve as media to store processor-executable code, data, or the like. These articles of manufacture may represent computer-readable media (e.g., any suitable form of memory or storage) that may store the processor-executable code used by the processor 44 to perform the presently disclosed techniques. The memory 46 and the storage 48 may also be used to store data described, various other software applications for analyzing the data, and the like. The memory 46 and the storage 48 may represent non-transitory computer-readable media (e.g., any suitable form of memory or storage) that store the processor-executable code used by the processor 44 to perform various techniques described herein. It should be noted that non-transitory merely indicates that the media is tangible and not a signal.

The I/O ports 50 may be interfaces that may couple to other peripheral components such as input devices (e.g., keyboard, mouse), sensors, input/output (I/O) modules, and the like. The display 52 may operate to depict visualizations associated with software or executable code being processed by the processor 44. In one embodiment, the display 52 may be a touch display capable of receiving inputs from a user of the vehicle maintenance record system 12. The display 52 may be any suitable type of display, such as a liquid crystal display (LCD), plasma display, or an organic light emitting diode (OLED) display, for example. Additionally, in one embodiment, the display 52 may be provided in conjunction with a touch-sensitive mechanism (e.g., a touch screen) that may function as part of a control interface for the vehicle maintenance record system 12.

It should be noted that the components described above with regard to the vehicle maintenance record system 12 are exemplary components and the vehicle maintenance record system 12 may include additional or fewer components as shown. Additionally, it should be noted that the electronic devices 14, the vehicle monitoring system 20, the sensors 22, and the computing device 32 may also include similar components as described as part of the vehicle maintenance record system 12.

With the preceding in mind, in some embodiments, a client or customer of a maintenance services system may purchase a vehicle and register the vehicle with the maintenance services system (e.g., via an application on the user's computing device). The purchase price (e.g., value) of the vehicle may be based off of the vehicle's manufacturer, model, age, and/or mileage, maintenance services performed on the vehicle, repairs performed on the vehicle, accidents the vehicle has been involved in, and the like. Further, the owner of the vehicle may purchase automobile insurance to cover the value of the vehicle and protect the owner from certain damage related incidents, and the like. After purchasing the vehicle, the owner may operate the vehicle, and normal wear and degradation may occur to components of the vehicle which may reduce the vehicle's value. As a result, vehicle owners are expected to perform routine maintenance (e.g., oil changes, tires rotations, tire changes) at certain thresholds to increase the longevity of the vehicle and to limit the decrease in the vehicle's value associated with the wear and degradation that occurs over time. That is, vehicles receiving routine maintenance may have an increased value when compared with vehicles receiving less than routine maintenance. For purposes of the present disclosure, routine maintenance may refer to an amount of maintenance that corresponds to a recommended baseline amount of maintenance for a particular vehicle. For example, a particular vehicle may be associated with a recommendation to receive an oil change every 3,000 miles. Thus, changing a vehicle's oil frequently (e.g., at every 3,000 miles or according to the recommendation) may be considered as performing "routine maintenance," while changing the oil less frequently (e.g., every 5,000 miles) may be considered as performing less than routine maintenance.

As maintenance services are performed by various service providers, the system may receive the data associated with the services performed and store the data within the system. In this way, upon purchasing and registering the vehicle, the system may identify and retrieve information related to a type of maintenance service performed, a time of service, a cost of service, the service provider performing the service, a frequency of the service, and the like. The system may analyze the data to identify a time that maintenance services are needed, and may send a notification (e.g., via an application) to the owner of the vehicle indicating that maintenance should be performed. The notification may include a recommendation to perform a particular maintenance service to mitigate the risk of being involved in an accident, and/or to mitigate the likelihood that the value of the vehicle will decrease as a result of not performing the recommended maintenance. In some embodiments, updated insurance packages may be available based on the maintenance services performed. Further, the cost of the available insurance packages may be related to the frequency of the maintenance services performed. That is, the cost of updated insurance packages for individuals performing routine maintenance may be less than the cost of insurance packages for individuals performing less than routine maintenance. By receiving and collecting the maintenance data on a particular vehicle, a relative value of the vehicle can be determined, owners may be notified at appropriate times to perform maintenance services, and owners may secure updated insurance coverage based on the vehicle's relative value.

Figure 3:
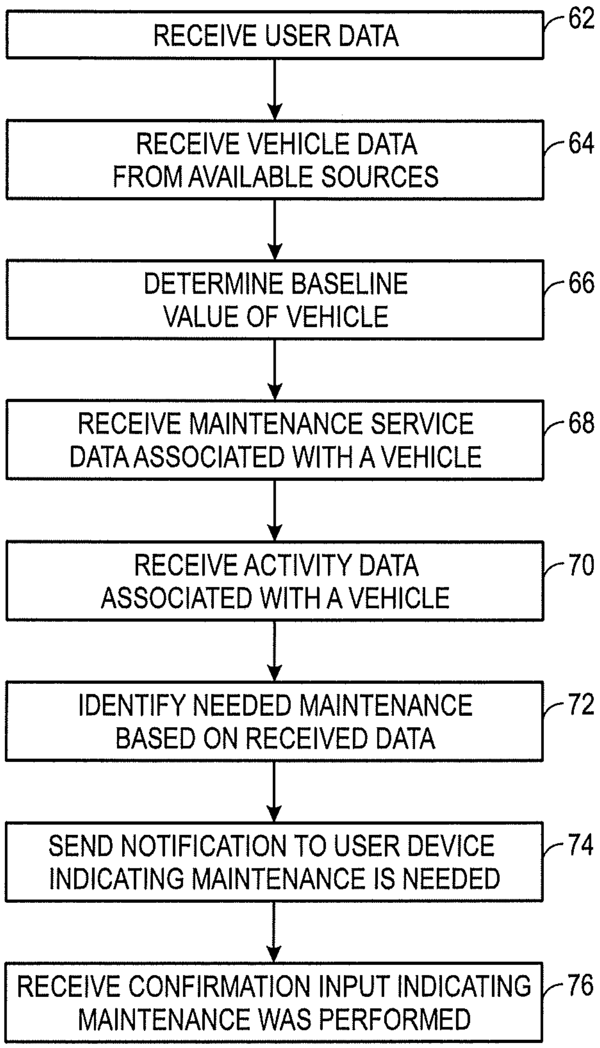
FIG. 3 illustrates a flow chart of a method for recommending maintenance services based on received data, in accordance with embodiments described herein.

With the foregoing in mind, FIG. 3 illustrates a flow chart of a method 60 employed by the vehicle maintenance record system 12 for generating a universal maintenance record and sending notifications that include recommendations to perform maintenance services. Although the following description of the method 60 is described in a particular order, it should be noted that the method 60 is not limited to the depicted order; and instead, the method 60 may be performed in any suitable order. In addition, although the vehicle maintenance record system 12 is described as performing the method 60, it should be understood that the method 60 may be performed by any suitable computing device including, for instance, the computing device 32 and the like.

Referring now to FIG. 3, at block 62, the vehicle maintenance record system 12 may receive user data 16 related to an individual registered with the vehicle maintenance record system 12 and may generate a universal record for the user. The user data 16 may include information related to the user's vehicles and/or insurance policies associated with the vehicles. As discussed above, the user data 16 may be directly input into the vehicle maintenance record system 12 via an application operating on an electronic device 14 or by the user's computing device 32. That is, a user may register with the vehicle maintenance record system 12 and upload information about the user's current vehicles via an application. The uploaded information may be related to the vehicle's manufacturer, age, mileage, model type, accident history, and the like, and/or any maintenance records the user may have available. In some embodiments, the user data 16 may be acquired by mining the individual's bank account information, credit card account information, online purchase records, or other suitable information source to determine what the user has purchased and/or paid for. That is, purchase and financial data received at block 62 may be indicative of the purchase of the vehicle itself, maintenance services paid for, repair work done, and the like, such that the vehicle maintenance record system 12 may identify when a vehicle is purchased and upload the vehicle's information into the vehicle maintenance record system 12.

At block 64, the vehicle maintenance record system 12 may receive vehicle maintenance data from other sources. The data from other sources may be retrieved by the other resources 24. The data from the other resources 24 may include information regarding the value of a particular vehicle and/or a manner in which the vehicle should be maintained (e.g., maintenance recommendations). For example, the vehicle maintenance record system 12 may receive purchase and sale information from a number of additional individuals purchasing the same vehicle as the customer or client of the vehicle maintenance record system 12. Similarly, the vehicle maintenance record system 12 may receive vehicle data from vehicle valuation sources (e.g., Kelly Blue Book). The vehicle maintenance record system 12 may use this data to compare values of vehicles having similar characteristics (e.g., mileage, age). As the vehicle maintenance record system 12 receives additional vehicle data, a confidence factor for valuating certain vehicles may increase. Additionally, the vehicle maintenance record system 12 may receive maintenance recommendations from manufacturers for particular vehicle types. For example, the vehicle maintenance record system 12 may receive information from a manufacturer recommending that a particular vehicle type should change the oil every 3,000 miles and rotate the tires every 7,500 miles or every 6 months. In turn, the maintenance recommendations may be used to prompt the user to perform maintenance, as described in greater detail below.

At block 66, the vehicle maintenance record system 12 may determine a baseline value of a user's vehicle based on the received data from blocks 62 and 64. As discussed above, the baseline value of the vehicle may be determined based on the age, manufacturer, model type, mileage, and/or accident history of the vehicle. The baseline value may also be related to the amount of maintenance already performed on the vehicle. Additionally, the vehicle maintenance record system 12 may use the information received at block 64 to cross reference and compare the value of other vehicles that have characteristics (e.g., make, model, mileage, and the like) similar to or the same as the user's vehicle.

At block 68, after registering a vehicle with the vehicle maintenance record system 12, the vehicle maintenance record system 12 may receive maintenance service data related to the registered vehicle. The vehicle maintenance record system 12 may receive the maintenance service data from the user and/or from service providers. For example, using an application operating on the user's computing device 32, the user may upload information related to maintenance services performed. In some embodiments, the maintenance service data may be directly uploaded to a universal record stored on the vehicle maintenance record system 12 based on inputs received from a user (e.g., text inputs, voice inputs, and the like). Further, a digital image of a receipt may be uploaded, and the receipt may be indicative of the services performed. The vehicle maintenance record system 12 may also mine the individual's purchase and financial history to automatically upload maintenance service related transactions. That is, the vehicle maintenance record system 12 may be configured to identify particular service providers and automatically upload transactions related to those providers. In other embodiments, the service provider may directly input maintenance service transactions into the universal record. That is, service providers may be aware that the user is a customer or client of the vehicle maintenance record system 12 and the service provider may have access to the user's universal record such that the service provider may upload maintenance services into the vehicle maintenance record system 12. Further, the user or service provider may utilize a plug-in stick typically used for diagnostic purposes. The plug-in stick may be inserted at the time the vehicle is undergoing maintenance such that any services performed are uploaded to the user's universal maintenance record. In still other embodiments, a vehicle identification number (VIN) may be scanned at the time maintenance services are performed, and any related services may be uploaded to the universal record. Thus, the vehicle maintenance record system 12 may receive maintenance service data from a number of different sources and may extract data (e.g., via the receipt, plug in stick, VIN, or a combination thereof) to identify a service provider, activities performed, a cost of the service, a time of the service, and the like. It should be noted that the vehicle maintenance record system 12 continuously monitors for incidents related to the vehicle's maintenance.

At block 70, the vehicle maintenance record system 12 may receive vehicle activity data associated with an individual. That is, the vehicle maintenance record system 12 may be configured to continuously monitor a vehicle's odometer (e.g., mileage), speedometer, and other sensors 22 (e.g., cameras) disposed within or around the vehicle that may provide information on a location of the vehicle, a speed of the vehicle, a duration of a trip (e.g., amount of time the vehicle is operating), the distance of a trip, activity of individuals within the vehicle, and the like. Further, the vehicle maintenance record system 12 may be configured to receive warning messages generated by the vehicle based on the operation of the vehicle. For example, the vehicle's check engine light may be activated as a result of the vehicle experiencing engine trouble. The vehicle maintenance record system 12 may receive an indication that the check engine light has been activated and may monitor an amount of time it takes for the user to address the problem. Longer wait times may be associated with an increased risk of accident as a result of not addressing the identified problem, which may affect the availability and/or cost of additional insurance options. Further, the vehicle maintenance record system 12 may utilize sensors disposed within or outside of the vehicle to acquire information related to the status of the vehicle. That is, the user's vehicle may be equipped with sensors configured to monitor certain parameters to determine whether the vehicle is operating under recommended parameters. For example, the vehicle maintenance record system 12 may receive tire pressure information from tire pressure sensors disposed within the vehicle's tires. Based on the maintenance recommendations from above, the vehicle maintenance record system 12 may determine that the vehicle's tire pressure is outside of a recommended threshold, and may then send a notification recommending maintenance, as described in greater detail below. Further, the sensors disposed within or outside of the vehicle may provide information related to a user's driving tendencies. For example, a camera associated with the vehicle may provide digital image data of the driver driving recklessly (e.g., speeding, ignoring traffic laws, turning sharply, and the like). Reckless driving may be associated with increased wear and degradation of the vehicle, which in turn may affect the vehicle's value. Thus, the vehicle maintenance record system 12 may analyze the data to determine whether to send a recommendation to refrain from certain driving tendencies to avoid an increase in an insurance policy premium or to avoid a decrease in the vehicle's relative value as a result of the user's driving tendencies.

After receiving the various types of data in blocks 62, 64, 66, 68, and 70, the vehicle maintenance record system 12 may, at block 72, analyze the data to identify potential maintenance services needed based on the received data. That is, the vehicle maintenance record system 12 may be configured to determine whether such data exceeds certain thresholds to identify when maintenance may be warranted. In some embodiments, the thresholds may be automatically set based on the received recommended maintenance data discussed above, while in other embodiments, the user may manually set the thresholds. In any case, it should be noted that the manner in which the vehicle maintenance record system 12 may identify needed maintenance should not be limited to those described below.

For example, if a number of miles between a particular maintenance service (e.g., oil change, tire rotation) exceeds a threshold value (e.g., 2,500 miles, 6,500 miles), or if an amount of time between a particular maintenance service exceeds a threshold value (e.g., 3 months, 6 months), the vehicle maintenance record system 12 may determine that maintenance services are warranted. The threshold value for each dataset may be associated with a particular value for the individual. That is, individuals may be able to change or adjust the threshold value needed to prompt or trigger that maintenance services are needed. In some embodiments, the vehicle maintenance record system 12 may obtain the threshold values from the recommended maintenance service data received at block 64. By adding the threshold value, and allowing a user to adjust the threshold value to their preference, individuals may be alerted to upcoming maintenance services at a time prior to the recommended service time being needed (e.g., based on the maintenance recommendations). For example, the maintenance recommendation data may indicate that a user's vehicle should have an oil change every 3,000 miles. In turn, the user may set the threshold value for oil changes at 2,500 miles, such that the vehicle maintenance record system 12 identifies that an oil change will be needed in the next 500 miles to satisfy the maintenance recommendations received from block 64.

At block 74, after evaluating the received datasets, the vehicle maintenance record system 12 may send a notification or alert to the user computing device 32. In some embodiments, the vehicle maintenance record system 12 may provide a notification for view by the individual display 52 on the computing device 32, such that the individual becomes aware of the notification for upcoming maintenance services. It should be noted that the notification may be transmitted in response to detecting the maintenance service parameter (e.g., mileage, time) exceeding the set threshold value. As such, if the vehicle maintenance record system 12 determines that maintenance is performed on the vehicle before the threshold value is exceeded, the vehicle maintenance record system 12 may reset and continue to monitor and collect additional information from the data sources until conditions in which the user needs maintenance may be present. In this way, in some embodiments, the user may specify the conditions in which the notification may be transmitted to the computing device 32. Further, in some embodiments, the user may elect to receive additional reminder recommendations after a first recommendation to perform maintenance is sent. That is, the vehicle maintenance record system 12 may be configured to send additional notifications at threshold values (e.g., every 100 miles) until the vehicle maintenance record system 12 determines that the suggested or recommended maintenance service has been performed.

In some embodiments, the vehicles may be autonomous vehicles capable of directing themselves to and from certain destinations. Further, the user data 16 received at block 62 may be indicative of a user's schedule. That is, users may provide information about their daily schedules such that the vehicle maintenance record system 12 may populate the universal record with this data to determine available time windows that the user will not need the vehicle (e.g., while the user is at work, at a movie, running errands). Accordingly, upon receiving the notification recommending the user to perform certain maintenance services from block 74, autonomous vehicles may check the user's schedule stored on the universal record, and if time is available, the autonomous vehicle may direct itself to the appropriate service provider such that the recommended maintenance may be performed.

At block 76, the vehicle maintenance record system 12 may receive an input from a user indicating that the recommended maintenance service has been performed. The input may be in the form of a text message, phone call, email, or the like. As discussed above, in some embodiments, the input confirming services performed may be received from the service provider and/or the user by scanning the receipt, using a plug-in stick, or scanning the vehicle's VIN at the time of service. That is, the vehicle maintenance record system 12 may automatically update or reset the threshold values upon receipt of maintenance services performed, thereby allowing the vehicle maintenance record system 12 to continue monitoring the vehicle for subsequent maintenance services, such that the universal records is updated with current information. It should be noted that the vehicle maintenance record system 12 may be configured to monitor an amount of time taken for a user to respond to a recommendation for maintenance. The vehicle maintenance record system 12 may be configured to update the universal record with the response time, which as discussed above, may be a factor in determining whether an updated insurance package for the vehicle is warranted, and if so, the costs of the updated insurance packages, as described in greater detail below.

In some embodiments, in addition to monitoring and analyzing received data to determine a time that maintenance services may be needed, the vehicle maintenance record system 12 may also be configured to determine a vehicle's adjusted value based at least in part on the frequency of service and/or the service provider performing the services. In turn, the adjusted vehicle value may be used to determine whether an update to an existing insurance policy or an offer for a new insurance policy may be warranted. For example, a user's existing insurance policy may be based at least in part on the value of the vehicle at the time the vehicle is being insured. The user's existing insurance policy may also be based on an assumption that the user will perform "routine maintenance" on the vehicle over the course of the vehicle's lifetime. In some cases, a user may perform less than routine maintenance or more than routine maintenance, which can affect the value of the vehicle. That is, vehicles receiving more than routine maintenance may have a value that is higher relative to vehicles that receive routine maintenance and/or less than routine maintenance. Accordingly, it may be beneficial to provide updates or notifications to users when a relative value associated with the user's vehicle changes as a result of maintenance services being performed or not being performed. If the vehicle has an increased value as a result of more than routine maintenance, the user may wish to update the insurance policy to reflect the increased value of the vehicle (e.g., receive more coverage because vehicle is more valuable). Conversely, if the vehicle has a decreased value as a result of less than routine maintenance, the insurer of the vehicle may wish to update the insurance policy to reflect the decreased value (e.g., insurance company does not cover as much because the vehicle is not worth as much). Further, in some embodiments, performing routine or more than routine maintenance may be associated with a decreased risk of being involved in an accident, while performing less than routine maintenance may be associated with an increased risk of being involved in an accident. As a result, users performing routine maintenance or more than routine maintenance may receive offers for insurance packages that are cheaper (e.g., lower premium) than those performing less than routine maintenance.

Figure 4:
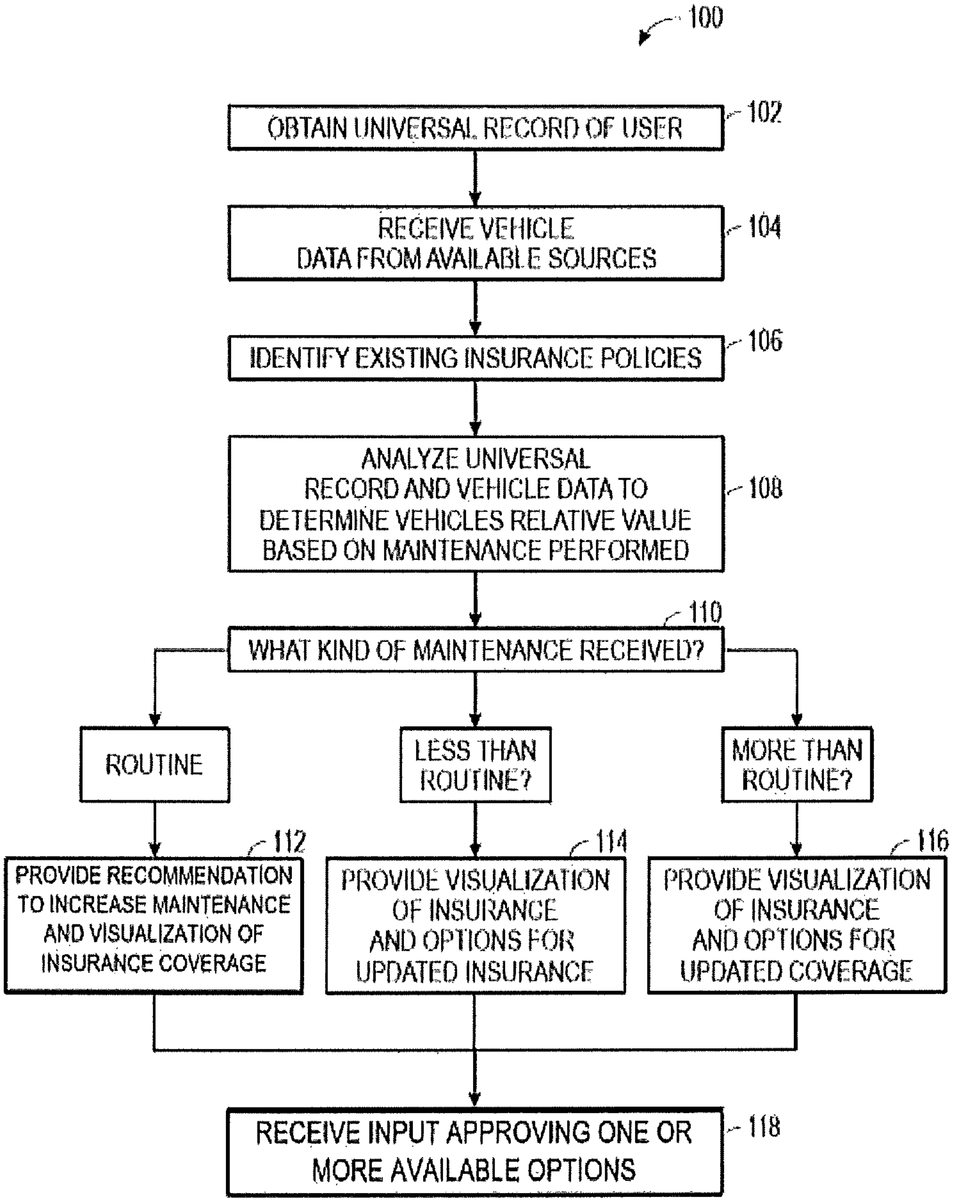
FIG. 4 illustrates a flow chart of a method for providing updated insurance options based on maintenance services performed, in accordance with embodiments described herein.

With the foregoing in mind, FIG. 4 illustrates a flow chart of a method 100 employed by the vehicle maintenance record system 12 for determining a vehicle's relative value based on maintenance services performed and providing notifications with updated options for insurance based on the vehicle's change in value. Although the following description of the method 100 is described in a particular order, it should be noted that the method 100 is not limited to the depicted order; and instead, the method 100 may be performed in any suitable order. In addition, although the vehicle maintenance record system 12 is described as performing the method 100, it should be understood that the method 100 may be performed by any suitable computing device, including for instance, the computing device 32, and the like.

Referring now to FIG. 4, at block 102, the vehicle maintenance record system 12 may obtain a user's universal record. The universal record may be obtained via the method 60 described above with respect to FIG. 3. As described above, the universal record may be associated with a user's vehicle and may be indicative of a time and/or frequency of maintenance services provided, a type of service provided, a service provider performing the service, repair services provided, accident history, and the like, which can be used to determine a vehicle's relative value.

After obtaining the universal record according to the method 60 of FIG. 3, the vehicle maintenance record system 12 may, at block 104, receive vehicle data from available sources much like in block 64 of FIG. 3. The data from other sources may be retrieved by the other resources 24. The data from the other sources may include information regarding the value of a particular vehicle and/or a manner in which the vehicle should be maintained (e.g., maintenance recommendations).

At block 106, the vehicle maintenance record system 12 may identify existing insurance policies associated with the user's vehicles. That is, as described above with respect to the method 60 of FIG. 3, the vehicle maintenance record system 12 may receive user data 16 from the user when generating the universal record and the user may provide information related to a user's insurance policies. For example, the driver (e.g., vehicle owner) may provide insurance information related to parties covered, amount of coverage, types of activities covered, premiums, deductibles, and the like. The existing insurance policies may be based on the assumption that the user will perform the suggested routine maintenance.

At block 108, the vehicle maintenance record system 12 may analyze the received data and universal record to determine the vehicle's relative value based on the maintenance services that have been performed. In some embodiments, a threshold amount of maintenance ($500 of maintenance, performing approved maintenance activities 5 times) may be required before the vehicle maintenance record system 12 may determine a relative value of the vehicle. That is, a vehicle's relative value may not be determined until the vehicle has been operated for a threshold amount, such that enough maintenance services can be performed to affect the value of the vehicle. The relative value of the vehicle may be determined by comparing the actual maintenance services performed on the vehicle with the manufacturer's recommendations for maintenance services. That is, as discussed above, the manufacturer of a particular vehicle may indicate that the vehicle should receive certain types of maintenance (e.g., oil change, tire rotation) at certain thresholds (e.g., every 3,000 miles, every 7,500 miles). These values may correspond to "routine maintenance." Thus, a particular type of vehicle receiving more than routine maintenance (e.g., oil change every 2,000 miles) from a first user may be more valuable than the same type of vehicle that receives less than routine maintenance (e.g., oil change every 4,000 miles) from a second user. Further, purchase history, invoices, and the like may be monitored to determine whether quality parts were used when needed for replacement. Unapproved or low quality parts may have a detrimental impact on vehicle value.

At block 110, the vehicle maintenance record system 12 may analyze the universal record to determine a type of maintenance received based on a frequency that the user performs maintenance, a frequency that the user responds to maintenance recommendations, a time it takes the user to respond to recommendations, the service provider performing the service, and the like. Increased levels of maintenance, and quick responsiveness to maintenance recommendations may be associated with an increase in the vehicle's value. For example, vehicles that are receiving more than routine maintenance and/or receiving recommended maintenance services quickly (e.g., within 100 miles, within 1 day of the notification) may be associated with increased values when compared to vehicles receiving routine or less than routine maintenance and/or receiving recommended maintenance services significantly after the services were suggested (e.g., services performed 1000 miles after recommendation, services performed 1 month after recommendation).

Upon determining that a user's vehicle is receiving "routine maintenance," the vehicle maintenance record system 12 may, at block 112, send a notification to the user's computing device 32 that causes an application to automatically open and display a visualization that provides a first indication of the user's insurance policy, and a second indication indicative of potential updates or options to the user's insurance policy if the user performs additional maintenance services. For example, the visualization may indicate that the user is paying $250 a month on a policy that provides up to $20,000 for vehicle damages and up to $100,000 in liability coverage. The visualization may also include a recommendation to increase the frequency of maintenance to become eligible for an updated insurance policy.

Upon determining that a user's vehicle is receiving "less than routine maintenance," the vehicle maintenance record system 12 may, at block 114, send a notification to the user's computing device 32 that causes an application to automatically open and display a visualization that provides a first indication of the user's insurance policy, and a second indication recommending the user to perform needed maintenance to avoid a change in the user's insurance policy. In some embodiments, the second indication may provide an alert that the changes to the user's insurance policy will automatically be implemented if the user does not perform maintenance by a certain threshold value (e.g., certain date, amount of time, amount of miles). In other embodiments, the user may be asked to select between a number of available options that accurately correspond to the vehicle's determined relative value. That is, in some embodiments, the user may not be provided with a recommendation to perform maintenance, and instead must choose between updated insurance options that accurately reflect the vehicle's value based on maintenance performed. For example, the options may include an increase in the user's premium as a result of not performing routine maintenance, or a decrease in the amount of damage coverage provided as a result of the vehicle having a decrease in relative value from not receiving routine maintenance).

Upon determining that a user's vehicle is receiving "more than routine maintenance," the vehicle maintenance record system 12 may, at block 116, send a notification to the user's computing device 32 that causes an application to automatically open and display a visualization that provides a first indication of the user's insurance policy, and a second indication that includes options for updated insurance packages that correspond to the vehicle's determined relative value. For example, as discussed above, a vehicle receiving more than routine maintenance may be associated with an increased value compared to the same vehicle receiving routine or less than routine maintenance. That is, after 5 years of routine maintenance services have been conducted, a particular vehicle may be worth $15,000, but the same vehicle receiving more than routine maintenance over the 5 years may be worth $20,000. Accordingly, user's that elect to perform more than routine maintenance on their vehicles may be eligible for updated insurance options that provide for more damage coverage that accurately corresponds to the value of the vehicle. Similarly, user's electing to perform more than routine maintenance may be eligible for options with lower insurance premiums because more than routine maintenance may be associated with a decreased risk of an accident.

It should be noted that in some embodiments, the notifications sent at blocks 112, 114, and 116 may also include an option to select insurance coverage based on the determined relative value. That is, a user may not have an existing insurance policy associated with the vehicle registered with the vehicle monitoring record system 12, and thus, the vehicle monitoring record system 12 may provide coverage options.

At block 118, the vehicle maintenance record system 12 may receive an input from the user computing device 32 approving one of the available options, and the vehicle maintenance record system 12 may update the user's existing insurance policy according to the options selected.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:

a computing device comprising a processor and a memory, wherein the processor is configured to:

receive vehicle data associated with a vehicle associated with a user, wherein the vehicle data is indicative of one or more characteristics of the vehicle;

receive maintenance recommendation data from a plurality of sources, wherein the maintenance recommendation data is indicative of one or more vehicle maintenance recommendations for the vehicle;

receive maintenance service data associated with the vehicle, wherein the maintenance service data is indicative of one or more maintenance services performed on the vehicle;

receive activity data from one or more sensors associated with the vehicle, wherein the activity data is associated with operation of the vehicle;

identify a maintenance service to be performed on the vehicle based on the vehicle data, the maintenance recommendation data, the maintenance service data, and the activity data; and send a notification to a user computing device associated with the user in response to identifying the maintenance service to be performed, wherein the notification comprises an indication of the maintenance service to be performed.

2. The system of claim 1, wherein the one or more characteristics of the vehicle comprises a manufacturer of the vehicle, a model of the vehicle, a year of the vehicle, a mileage of the vehicle, an accident history of the vehicle, or any combination thereof.

3. The system of claim 1, wherein the maintenance service data is further indicative of a service provider responsible for performing the one or more maintenance services, a cost of the one or more maintenance services, a time the one or more maintenance services was performed, a frequency of the one or more maintenance services, or any combination thereof.

4. The system of claim 1, wherein the processor is configured to:

receive reference vehicle data from the plurality of sources, wherein the reference vehicle data is indicative of respective values of one or more vehicles having characteristics with less than a threshold amount of deviation from the one or more characteristics of the vehicle;

compare the vehicle data with the reference vehicle data; and determine a baseline value of the vehicle based on the vehicle data and the reference vehicle data, wherein the baseline value corresponds to the vehicle having a recommended amount of maintenance.

5. The system of claim 4, wherein the processor is configured to:

receive insurance data associated with the user, wherein the insurance data is indicative of one or more existing insurance policies covering the vehicle based on the baseline value of the vehicle;

determine an amount of maintenance performed on the vehicle based on the maintenance service data and the activity data;

determine a relative value of the vehicle based on the amount of maintenance performed; and send an additional notification to the user computing device, wherein the additional notification comprises an additional indication of one or more available insurance policies for selection based on the relative value of the vehicle.

6. The system of claim 5, wherein the processor is configured to:

receive one or more warning messages from the vehicle, wherein the one or more warning messages are indicative of an issue associated with the vehicle;

monitor an amount of time for the user to resolve the issue associated with the vehicle;

determine an adjusted relative value of the vehicle based on the amount of time for the user to resolve the issue; and update the one or more available insurance policies based on the adjusted relative value of the vehicle.

7. The system of claim 6, wherein the relative value of the vehicle decreases based on the amount of time for the user to resolve the issue exceeding a threshold amount of time.

8. The system of claim 1, wherein the processor is configured to receive the maintenance service data by mining a purchase history of the user, wherein the purchase history is indicative of one or more transactions associated with the one or more maintenance services performed.

9. The system of claim 1, wherein the one or more vehicle maintenance recommendations are associated with a plurality of threshold values defining acceptable amounts of activity associated with the vehicle between respective maintenance services performed on the vehicle, and wherein the processor is configured to:

monitor an amount of activity performed by the vehicle based on the activity data; and identify the maintenance service to be performed based on the amount of activity exceeding a threshold value of the plurality of threshold values.

10. The system of claim 9, wherein the processor is configured to:

receive an additional indication that the maintenance service to be performed has been performed; and reset the amount of activity performed by the vehicle in response to receiving the additional indication.

11. The system of claim 9, wherein the amount of activity is indicative of a number of miles traveled by the vehicle after a particular maintenance service of the one or more maintenance services performed on the vehicle, and wherein the processor is configured to identify the maintenance service to be performed based on the number of miles exceeding a threshold number of miles.

12. A non-transitory, computer-readable medium comprising computer-executable instructions configured to, when executed, cause a processor to:

receive vehicle data associated with a vehicle associated with a user, wherein the vehicle data is indicative of one or more characteristics of the vehicle;

receive maintenance recommendation data from a plurality of sources, wherein the maintenance recommendation data is indicative of one or more vehicle maintenance recommendations for the vehicle, and wherein the one or more vehicle maintenance recommendations correspond to one or more threshold values that define a routine amount of maintenance for the vehicle;

receive maintenance service data associated with the vehicle, wherein the maintenance service data is indicative of an amount of maintenance performed on the vehicle;

receive activity data from one or more sensors associated with the vehicle, wherein the activity data is associated with operation of the vehicle;

receive reference vehicle data from a plurality of sources, wherein the reference vehicle data is indicative of relative values of one or more vehicles having characteristics with less than a threshold amount of deviation from the one or more characteristics of the vehicle; and determine a relative value of the vehicle based on the vehicle data, the maintenance recommendation data, the maintenance service data, the activity data, and the reference vehicle data.

13. The non-transitory, computer-readable medium claim 12, wherein the relative value of the vehicle is determined by:

comparing the maintenance service data with the maintenance recommendation data; and determining an amount of deviation between the amount of maintenance performed on the vehicle and the routine amount of maintenance defined by the one or more threshold values.

14. The non-transitory, computer-readable medium of claim 12, wherein the processor is configured to:

receive insurance data associated with the user, wherein the insurance data is indicative of one or more existing insurance policies covering the vehicle, wherein the one or more existing insurance policies are based on the relative value of the vehicle and an assumption that the routine amount of maintenance will be performed on the vehicle;

determine that the amount of maintenance performed on the vehicle is different than the routine amount of maintenance;

determine an adjusted relative value of the vehicle based on the amount of maintenance performed;

send a notification to a computing device associated with the user, wherein the notification is configured to cause the computing device to present one or more options for insurance coverage, wherein a cost of the one or more options for insurance coverage is based on the adjusted relative value of the vehicle;

receive a selection of at least one of the one or more options for insurance coverage from the user; and update the one or more existing insurance policies to an updated insurance policy based on the selection of the at least one of the one or more options for insurance coverage.

15. The non-transitory, computer-readable medium of claim 14, wherein the adjusted relative value of the vehicle is configured to decrease based on the amount of maintenance performed on the vehicle being less than the routine amount of maintenance, and wherein the adjusted relative value of the vehicle is configured to increase based on the amount of maintenance performed on the vehicle exceeding the routine amount of maintenance.

16. The non-transitory, computer-readable medium of claim 14, wherein the processor is configured to:

identify a maintenance service to be performed on the vehicle based on the vehicle data, the maintenance recommendation data, the maintenance service data, and the activity data;

monitor an amount of time taken to perform the maintenance service to be performed; and determine the adjusted relative value of the vehicle based on the amount of time taken to perform the maintenance service to be performed.

17. The non-transitory, computer-readable medium of claim 16, wherein the adjusted relative value of the vehicle decreases based on the amount of time taken to perform the maintenance service to be performed exceeding a threshold amount of time.

18. A method, comprising:

receiving, via a processor, vehicle data associated with a vehicle associated with a user, wherein the vehicle data is indicative of one or more characteristics of the vehicle;

receiving, via the processor, maintenance recommendation data from a plurality of sources, wherein the maintenance recommendation data is indicative of a recommended amount of maintenance for the vehicle;

receiving, via the processor, maintenance service data associated with the vehicle, wherein the maintenance service data corresponds to one or more maintenance services performed on the vehicle;

receiving, via the processor, activity data from one or more sensors associated with the vehicle, wherein the activity data is associated with operation of the vehicle;

identifying, via the processor, a maintenance service to be performed on the vehicle based on the vehicle data, the maintenance recommendation data, the maintenance service data, and the activity data; and sending, via the processor, a notification to a user computing device associated with the user in response to identifying the maintenance service to be performed, wherein the notification comprises an indication of the maintenance service to be performed.

19. The method of claim 18, comprising:

receiving, via the processor, reference vehicle data from the plurality of sources, wherein the reference vehicle data is indicative of respective values of one or more vehicles having characteristics with less than a threshold amount of deviation to the one or more characteristics of the vehicle;

determining, via the processor, a baseline value of the vehicle based on the vehicle data and the reference vehicle data, wherein the baseline value corresponds to a value of the vehicle having the recommended amount of maintenance for the vehicle;

receiving, via the processor, insurance data associated with the user, wherein the insurance data is indicative of one or more existing insurance policies covering the vehicle based on the baseline value of the vehicle;

determining, via the processor, a relative value of the vehicle based an amount of maintenance performed on the vehicle being different than the recommended amount of maintenance; and sending, via the processor, an additional notification to the user computing device in response to determining that the relative value of the vehicle is different that the baseline value of the vehicle, wherein the additional notification comprises one or more options for insurance coverage based on the relative value of the vehicle.

20. The method of claim 18, wherein the one or more characteristics of the vehicle comprises a manufacturer of the vehicle, a model of the vehicle, a year of the vehicle, a mileage of the vehicle, an accident history of the vehicle, or any combination thereof, and wherein the maintenance service data is indicative of a service provider responsible for performing the one or more maintenance services, a cost of the one or more maintenance services, a time the one or more maintenance services was performed, a frequency of the one or more maintenance services, or any combination thereof.

* * * * *